US008892704B2

(12) United States Patent
Bronez et al.

(10) Patent No.: US 8,892,704 B2
(45) Date of Patent: Nov. 18, 2014

(54) DYNAMIC RULE-BASED DISTRIBUTED NETWORK OPERATION FOR WIRELESS SENSOR NETWORKS

(75) Inventors: Thomas Bronez, Vienna, VA (US); Michelle Casagni, Great Falls, VA (US)

(73) Assignee: The Mitre Corporaton, McLean, VA (US)

( * ) Notice: Subject to any disclaimer, the term of this patent is extended or adjusted under 35 U.S.C. 154(b) by 1204 days.

(21) Appl. No.: 11/399,387

(22) Filed: Apr. 7, 2006

(65) Prior Publication Data

US 2007/0239862 A1 Oct. 11, 2007

(51) Int. Cl.
*G06F 15/173* (2006.01)
*H04W 4/00* (2009.01)
*H04L 12/24* (2006.01)
*H04L 29/08* (2006.01)
*H04L 12/26* (2006.01)
*H04W 84/18* (2009.01)

(52) U.S. Cl.
CPC ........... *H04L 12/24* (2013.01); *H04L 41/00* (2013.01); *H04L 41/5077* (2013.01); *H04L 67/12* (2013.01); *H04L 41/5051* (2013.01); *H04L 43/0811* (2013.01); *H04L 43/0852* (2013.01); *H04W 84/18* (2013.01); *H04L 41/12* (2013.01)
USPC ............................. 709/223; 709/224; 370/338

(58) Field of Classification Search
CPC ......... H04L 12/24; H04L 67/12; H04L 41/00; H04L 41/12; H04L 41/5051; H04L 41/5077; H04L 43/0811; H04L 43/0852; H04W 84/18
USPC ................................... 709/223, 224; 370/338
See application file for complete search history.

(56) References Cited

U.S. PATENT DOCUMENTS

| | | | | |
|---|---|---|---|---|
| 6,421,354 B1 * | 7/2002 | Godlewski | .................... | 370/466 |
| 6,650,779 B2 * | 11/2003 | Vachtesvanos et al. | ........ | 382/228 |
| 6,684,339 B1 * | 1/2004 | Willig | ............................ | 713/300 |
| 7,016,812 B2 * | 3/2006 | Aritsuka et al. | ............... | 702/188 |
| 7,020,701 B1 * | 3/2006 | Gelvin et al. | ................. | 709/224 |
| 7,181,192 B2 * | 2/2007 | Panasik et al. | ............. | 455/404.1 |
| 7,250,855 B2 * | 7/2007 | Suenbuel et al. | ............. | 340/511 |

(Continued)

OTHER PUBLICATIONS

Van Greunen, J., et al., "Adaptive sleep discipline for energy conservation and robustness in dense sensor networks," Communications, 2004 IEEE International Conference on, vol. 6, No., pp. 3657,3662 vol. 6, Jun. 20-24, 2004, <URL: http://ieeexplore.ieee.org/stamp/stamp.jsp?tp=&arnumber=1313225&isnumber=29123>.*

Deb, B.; Bhatnagar, S.; Nath, B., "Reinform: reliable information forwarding using multiple paths in sensor networks," Local Computer Networks, 2003. LCN '03. Proceedings. 28th Annual IEEE International Conference on, vol., No., pp. 406, 415, Oct. 20-24, 2003. <URL: http://ieeexplore.ieee.org/stamp/stamp.jsp?tp=&arnumber=1243166&isnumber=27859>.*

(Continued)

*Primary Examiner* — Rupal Dharia
*Assistant Examiner* — Wing Ma
(74) *Attorney, Agent, or Firm* — Sterne, Kessler, Goldstein & Fox P.L.L.C.

(57) ABSTRACT

Methods and systems for smart data processing and dissemination in wireless sensor networks are provided herein. In one aspect, the present invention provides dynamic and independent data processing and dissemination at individual sensor nodes in a wireless sensor network. In another aspect, the present invention provides data processing and/or dissemination methods at a sensor node that are responsive to, among other parameters, network traffic conditions, network connectivity conditions, conditions at the sensor node, and the data characteristics and QOS (Quality of Service) requirements of the data being processed and/or disseminated. In yet another aspect, data processing and/or dissemination rules according to the present invention are easily configurable and modifiable depending on the specific sensor networking application.

34 Claims, 7 Drawing Sheets

(56) References Cited

U.S. PATENT DOCUMENTS

| | | | |
|---|---|---|---|
| 7,327,248 B2* | 2/2008 | Odenwald et al. | 340/517 |
| 7,403,114 B2* | 7/2008 | Moriwaki | 340/539.22 |
| 7,436,789 B2* | 10/2008 | Caliskan et al. | 370/310.1 |
| 7,466,681 B2* | 12/2008 | Ashwood-Smith et al. | 370/338 |
| 7,475,158 B2* | 1/2009 | Ferri et al. | 709/238 |
| 8,130,669 B2* | 3/2012 | Radunovic et al. | 370/252 |
| 8,175,016 B1* | 5/2012 | Basu et al. | 370/311 |
| 8,675,484 B2* | 3/2014 | Radunovic et al. | 370/230 |
| 2002/0165933 A1* | 11/2002 | Yu et al. | 709/217 |
| 2003/0063585 A1* | 4/2003 | Younis et al. | 370/331 |
| 2003/0202468 A1* | 10/2003 | Cain et al. | 370/229 |
| 2004/0203898 A1 | 10/2004 | Bodin et al. | |
| 2004/0218602 A1* | 11/2004 | Hrastar | 370/390 |
| 2004/0246904 A1* | 12/2004 | Zhang et al. | 370/252 |
| 2004/0254652 A1* | 12/2004 | Ota et al. | 700/12 |
| 2005/0207376 A1* | 9/2005 | Ashwood-Smith et al. | 370/338 |
| 2005/0251564 A1 | 11/2005 | Tillotson et al. | |
| 2005/0260996 A1 | 11/2005 | Groenendal | |
| 2005/0271002 A1* | 12/2005 | Abe et al. | 370/328 |
| 2006/0017566 A1* | 1/2006 | Gauvreau et al. | 340/541 |
| 2006/0031426 A1* | 2/2006 | Mesarina et al. | 709/220 |
| 2006/0153154 A1* | 7/2006 | Yoon et al. | 370/338 |
| 2006/0164040 A1* | 7/2006 | Ohkubo | 320/135 |
| 2006/0176169 A1* | 8/2006 | Doolin et al. | 340/521 |
| 2006/0200542 A1* | 9/2006 | Willig | 709/223 |
| 2006/0215588 A1* | 9/2006 | Yoon | 370/310 |
| 2006/0262721 A1* | 11/2006 | Radunovic et al. | 370/229 |
| 2006/0271661 A1* | 11/2006 | Qi et al. | 709/223 |
| 2006/0280129 A1* | 12/2006 | Kline et al. | 370/254 |
| 2007/0003146 A1* | 1/2007 | Ko et al. | 382/224 |
| 2007/0004466 A1* | 1/2007 | Haartsen | 455/572 |
| 2007/0014268 A1* | 1/2007 | Kim et al. | 370/338 |
| 2007/0044539 A1* | 3/2007 | Sabol et al. | 73/19.01 |
| 2007/0150565 A1* | 6/2007 | Ayyagari et al. | 709/223 |
| 2007/0195808 A1* | 8/2007 | Ehrlich et al. | 370/408 |
| 2007/0226616 A1* | 9/2007 | Gagvani et al. | 715/700 |
| 2007/0236345 A1* | 10/2007 | Yu et al. | 340/539.22 |
| 2008/0221836 A1* | 9/2008 | Tateson | 702/188 |
| 2008/0253327 A1* | 10/2008 | Kohvakka et al. | 370/330 |
| 2008/0259919 A1* | 10/2008 | Monga | 370/389 |

OTHER PUBLICATIONS

Lee, J. et al. "Impact of Energy Depletion and Reliability on Wireless Sensor Network Connectivity," Department of Electrical Engineering, University of Southern California, 2004. Retrieved from the Internet: <URL:http://ceng.usc.edu/~bkrishna/research/papers/ds04-jaejlee-final.pdf>.*

International Search Report for PCT/US06/13255, dated Dec. 18, 2007, 8 pages.

Bradner, S. and Paxton, V., "IANA Allocation Guidelines For Values in the Internet Protocol and Related Headers," *RFC 2780 IANA Assignments*: The Internet Society, available at <http://tools.ietf.org/html/rfc2780>, (Mar. 2000).

Corrigan, S., "Introduction to the Controller Area Network," *Application Report SLOA101A*: 1-14, Texas Instruments, United States, available at <http://www.ti.com/lit/an/sloa101a/sloa101a.pdf>, (Aug. 2002; revised Jul. 2008).

"Internet Protocol: DARPA Internet Program Protocol Specification," prepared by Information Sciences Institute University of Southern California for Defense Advanced Research Projects Agency Information Processing Techniques Office, 45 pages, accessed at <http://tools.ietf.org/html/rfc791>, United States (Sep. 1981).

"Chapter 11: Switching in the PSTN," in *Telecommunications: A Beginner's Guide*, Hill Associates Inc., Edition 1, pp. 231-232, McGraw-Hill/Osborne, United States (2001).

Iverson, B.V., "Teletraffic Engineering and Network Planning," *DTU Course 34340*, 554 pages, Technical University of Denmark, Denmark (May 2009).

"Marking Network Traffic," Cisco Systems, Inc., 22 pages, available at <http://www.cisco.com/en/US/docs/ios/qos/configuration/guide/mrkg_netwk_traffic.pdf>, (May 2005; revised Jul. 2010).

Xiao, X., et al., "Traffic Engineering with MPLS in the Internet." *IEEE Network* 14(2):28-33, IEEE, United States (Mar./Apr. 2000).

The Written Opinion of the International Searching Authority for International Patent Application PCT/US06/13255, Commissioner for Patents, United States, mailed on Dec. 18, 2007.

* cited by examiner

```xml
<?xml version="1.0" encoding="utf-8" ?>
<FactBase xmlns="RulesSchema.xsd">
  <Rules>
    <Rule RuleName="beep when alert (event) received">
      <Conditions>
        <Condition FieldName="DataType" FieldType="DataTypeField" FieldAssm="RuleEngine" Operation="Equal" Value="none" LogicalOperation="AND" />
      </Conditions>
      <Action ActionType="LocalControlAction" ActionAssm="RuleEngine" Destination="beeper" Data="" Priority="1" />
    </Rule>
    <Rule RuleName="display any data">
      <Conditions>
        <Condition FieldName="DataType" FieldType="DataTypeField" FieldAssm="RuleEngine" Operation="NotEqual" Value="none" LogicalOperation="OR" />
        <Condition FieldName="DataType" FieldType="DataTypeField" FieldAssm="RuleEngine" Operation="Equal" Value="none" LogicalOperation="OR" />
      </Conditions>
      <Action ActionType="LocalDataAction" ActionAssm="RuleEngine" Destination="display" Data="" Priority="2" />
    </Rule>
    <Rule RuleName="persist everything received">
      <Conditions>
        <Condition FieldName="SensorType" FieldType="SensorTypeField" FieldAssm="RuleEngine" Operation="NotEqual" Value="unknown" LogicalOperation="AND" />
      </Conditions>
      <Action ActionType="LocalDataAction" ActionAssm="RuleEngine" Destination="storage" Data="" Priority="3" />
    </Rule>
  </Rules>
</FactBase>
```

FIG. 6

```xml
<?xml version="1.0" encoding="utf-8" ?>
<FactBase xmlns="RulesSchema.xsd">
  <Rules>
    <Rule RuleName="Upon radar report from local node (10.10.10.108), take a picture with local camera">
      <Conditions>
        <Condition FieldName="SensorType" FieldType="SensorTypeField"
          FieldAssm="RuleEngine" Operation="Equal" Value="radar"
          LogicalOperation="AND" />
        <Condition FieldName="IpAddr" FieldType="IPField"
          FieldAssm="RuleEngine" Operation="Equal" Value="10.10.10.108"
          LogicalOperation="AND" />
      </Conditions>
      <Action ActionType="LocalControlAction" ActionAssm="RuleEngine"
        Destination="camera" Data="" Priority="2" />
    </Rule>
    <Rule RuleName="Upon radar report from local node (10.10.10.108), send an event notification to all other nodes">
      <Conditions>
        <Condition FieldName="SensorType" FieldType="SensorTypeField"
          FieldAssm="RuleEngine" Operation="Equal" Value="radar"
          LogicalOperation="AND" />
        <Condition FieldName="IpAddr" FieldType="IPField"
          FieldAssm="RuleEngine" Operation="Equal" Value="10.10.10.108"
          LogicalOperation="AND" />
      </Conditions>
      <Action ActionType="SendEventAction" ActionAssm="RuleEngine"
        Destination="floodAll" Data="" Priority="1" />
    </Rule>
    <Rule RuleName="Upon radar report from local node, forward report to command node (10.10.10.100)">
      <Conditions>
        <Condition FieldName="SensorType" FieldType="SensorTypeField"
          FieldAssm="RuleEngine" Operation="Equal" Value="radar"
          LogicalOperation="AND" />
        <Condition FieldName="DataType" FieldType="DataTypeField"
          FieldAssm="RuleEngine" Operation="Equal" Value="text"
          LogicalOperation="AND" />
      </Conditions>
      <Action ActionType="SendAction" ActionAssm="RuleEngine"
        Destination="direct" Data="10.10.10.100" Priority="3" />
    </Rule>
    <Rule RuleName="Upon local camera image, send an event notification to all other nodes">
      <Conditions>
        <Condition FieldName="SensorType" FieldType="SensorTypeField"
          FieldAssm="RuleEngine" Operation="Equal" Value="camera"
          LogicalOperation="AND" />
        <Condition FieldName="DataType" FieldType="DataTypeField"
          FieldAssm="RuleEngine" Operation="Equal" Value="image"
          LogicalOperation="AND" />
      </Conditions>
      <Action ActionType="SendEventAction" ActionAssm="RuleEngine"
        Destination="floodAll" Data="" Priority="1" />
    </Rule>
    <Rule RuleName="Upon local camera image, forward image to command node (10.10.10.100)">
      <Conditions>
        <Condition FieldName="SensorType" FieldType="SensorTypeField"
          FieldAssm="RuleEngine" Operation="Equal" Value="camera"
          LogicalOperation="AND" />
        <Condition FieldName="DataType" FieldType="DataTypeField"
          FieldAssm="RuleEngine" Operation="Equal" Value="image"
          LogicalOperation="AND" />
      </Conditions>
      <Action ActionType="SendAction" ActionAssm="RuleEngine"
        Destination="direct" Data="10.10.10.100" Priority="3" />
    </Rule>
  </Rules>
</FactBase>
```

DYNAMIC RULE-BASED DISTRIBUTED NETWORK OPERATION FOR WIRELESS SENSOR NETWORKS

STATEMENT REGARDING FEDERALLY SPONSORED RESEARCH AND DEVELOPMENT

The U.S. government has a paid-up license in this invention and the right in limited circumstances to require the patent owner to license others on reasonable terms as provided for by the terms of Contract No. W15P7T-05-C-F600 awarded by the United States Army.

FIELD OF THE INVENTION

The present invention relates generally to data processing and dissemination in a wireless network. More particularly, the invention relates to a method and system for rule-based data processing and dissemination in a wireless sensor network.

BACKGROUND OF THE INVENTION

Wireless sensor networks consisting of large numbers of inexpensive and energy-constrained devices are an emerging area of networking research. Wireless sensor networks are expected to find a wide range of applications including target tracking, habitat monitoring, and disaster relief.

Due to the severely constrained network resources that characterize the majority of wireless sensor networks, efficient data dissemination represents a major challenge in the design of self-configurable wireless sensor networks that can be sustained for lifetimes useful for their intended applications.

The majority of research in the area of efficient data dissemination in wireless sensor networks have focused on the design of routing algorithms that attempt to minimize the amount of routing overhead traffic through the network. Most commonly, algorithms that utilize event subscriptions, whereby events are disseminated on-demand in the network, have been proposed. Other algorithms that use data fusion techniques to reduce the amount of data traffic in the network have also been put forward.

One common drawback to the above described data dissemination methods is that they are based on fixed dissemination rules that are applied globally at every sensor node in the network. Further, they distinguish among neither the types of data to be disseminated nor the various transport mechanisms by which data may be disseminated. Accordingly, these algorithms lack the ability to independently and dynamically process and disseminate data at a sensor node based on operating conditions at the node itself. This typically results in these algorithms being very inefficient when applied in heterogeneous sensor networks or when network conditions become non-uniform in the network.

What is needed therefore are methods and systems for data processing and dissemination in a wireless sensor network that provide dynamic data processing and dissemination independently at each sensor node in the network.

BRIEF SUMMARY OF THE INVENTION

Methods and systems for smart data processing and dissemination in wireless sensor networks are provided herein.

In one aspect, embodiments of the present invention provide dynamic and independent data processing and dissemination at individual sensor nodes in a wireless sensor network.

In another aspect, embodiments of the present invention provide data processing and/or dissemination methods at a sensor node that are responsive to, among other parameters, network traffic conditions, network connectivity conditions, host conditions at the sensor node, and the data characteristics and QOS (Quality of Service) requirements of the data being processed and/or disseminated.

In a further aspect, embodiments of the present invention enable customized data processing and/or dissemination at a sensor node in a wireless sensor network. In other words, data processing and/or dissemination are not tied to fixed network-wide rules for data processing and/or dissemination, but may have variable rules set independently at each sensor node in the network. Accordingly, nodes in the network may use different processing and/or dissemination methods from each other depending on measured and/or actual network and/or device conditions. Further, a sensor node may use any of various processing and/or dissemination methods available thereto according to a rule set that defines the best processing and/or dissemination methods based on network, traffic, and device conditions.

In yet another aspect, data processing and/or dissemination rules according to the present invention are easily configurable and modifiable depending on the specific sensor networking application. In an embodiment, data processing and/or dissemination rules are configured using a human readable language such as XML (Extensible Markup Language), for example, which may be readily changed without recompiling. Accordingly, data processing and/or dissemination rules according to the present invention may be extended to other types of ad hoc networks including personal area networks and smart home networks, for example.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 is an example rule set for a wireless sensor node.

FIG. 7 is another example rule set for a wireless sensor node.

The present invention will be described with reference to the accompanying drawings. The drawing in which an element first appears is typically indicated by the leftmost digit(s) in the corresponding reference number.

DETAILED DESCRIPTION OF THE INVENTION

Wireless Sensor Networks

Figure 1:
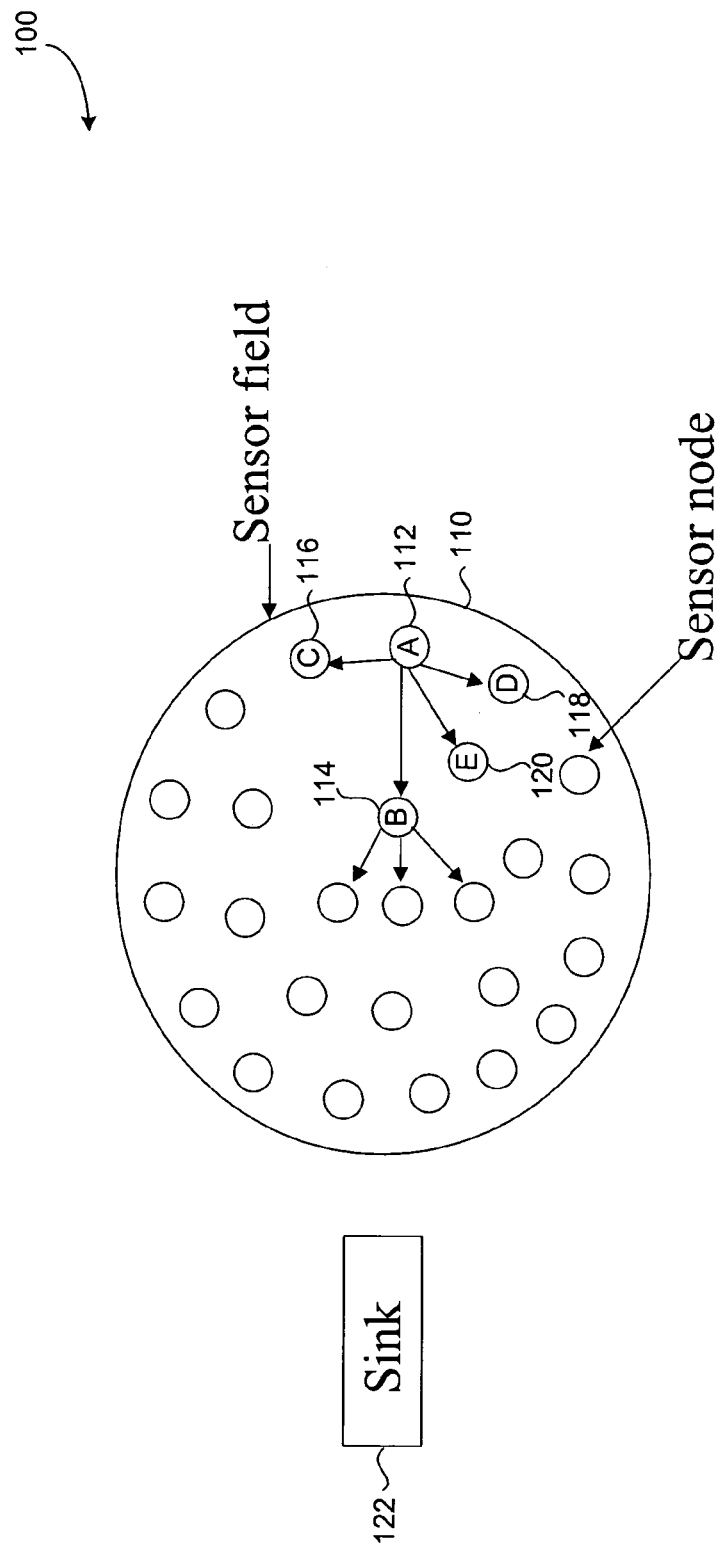
FIG. 1 is an example illustration of a wireless sensor network.

Wireless sensor networks represent an emerging area in networking research. Wireless sensor networks are expected to find a wide range of applications including target tracking, habitat monitoring, and disaster relief. With typical applications involving sensing in harsh and inhospitable terrains, wireless sensor networks consist of large numbers of wireless devices, each capable of sensing, processing, and communication, that are spread over a sensing field. Together, the wireless devices self-configure into a network without any existing infrastructure, and cooperatively sense, process, and disseminate information to a user of the network. FIG. 1 illustrates an example wireless sensor network. In the example of FIG. 1, a large number of wireless sensor nodes are spread over a sensor field 110. Sensor field 110 may be a terrain not accessible to a human user, for example. Through wireless connections, the nodes self-configure into a network and may transmit sensed events data to each other or to a sink node 122 located outside the sensor field. Sink node 122 may be a user node of the network or a base station node that relays the received information to a user of the network. In the example of FIG. 1, node A 112 disseminates information to its neighbor nodes B 114, C 116, D 118, and E 120, perhaps for cooperative processing. In turn, node B 114 may disseminate the information to its neighbor nodes, perhaps to alert them to an oncoming target or event.

Data Dissemination in Wireless Sensor Networks

Due to the envisioned large scale of wireless sensor networks, individual sensor nodes are expected to be inexpensive devices, and thus will have limited resources. This includes having to operate on small energy supplies as well as having limited processing and communication capabilities.

In a wireless sensor node, communication represents the main source of energy consumption. Accordingly, it is essential that available energy at a sensor node is carefully spent in order to maximize the lifetime of the network. Further, due to the large scale of wireless sensor networks (and the resulting high network density), local bandwidth in the network must be shared, and, subsequently, the ability of any node to communicate at a given instant of time is reduced. This accentuates the need for efficient data processing and dissemination in wireless sensor networks.

As described above, conventional data processing and dissemination methods for wireless sensor networks focus on energy-efficient routing and fusion techniques with less regard to the non-uniform operating conditions and data types that typically occur in wireless sensor networks. Accordingly, conventional methods are inefficient in the face of non-homogeneous networks, whereby nodes may have different operating conditions, capabilities, and network traffic levels. Further, conventional methods are based on fixed processing and dissemination strategies making them less dynamic and less responsive to the specific conditions of a given sensor node.

Rule-Based Smart Data Processing and Dissemination

Methods and systems for smart data processing and dissemination in wireless sensor networks are provided herein.

In one aspect, embodiments of the present invention provide dynamic and independent data processing and dissemination at individual sensor nodes in a wireless sensor network.

In another aspect, embodiments of the present invention provide data processing and/or dissemination methods at a sensor node that are responsive to, among other parameters, network traffic conditions, network connectivity conditions, conditions at the sensor node, and the data characteristics and QOS (Quality of Service) requirements of the data being processed and/or disseminated.

In a further aspect, embodiments of the present invention enable customized data processing and/or dissemination at a sensor node in a wireless sensor network. In other words, data processing and/or dissemination are not tied to fixed network-wide rules for data processing and/or dissemination, but may have variable rules set independently at each sensor node in the network. Accordingly, nodes in the network may use different processing and/or dissemination methods from each other depending on measured and/or actual network and/or device conditions. Further, a sensor node may use any of various processing and/or dissemination methods available thereto according to a rule set that defines the best processing and/or dissemination methods based on network, traffic, and device conditions.

In yet another aspect, data processing and/or dissemination rules according to the present invention are easily configurable and modifiable depending on the specific sensor networking application. In an embodiment, data processing and/or dissemination rules are configured using a human readable language such as XML (Extensible Markup Language), for example, which may be readily changed without recompiling. Accordingly, data processing and/or dissemination rules according to the present invention may be extended to other types of ad hoc networks, such as personal area networks and smart home networks, for example.

Embodiments of the present invention will now be described. While certain embodiments will be presented in the context of wireless sensor networks, the invention is not limited to such networks. In fact, as will become apparent to a person skilled in the art(s) based on the teachings herein, the present invention may, in several aspects, be extended to the more general context of ad hoc networks. Further, methods and systems of the present invention may be highly useful for heterogeneous wireless networks as well as networks with expected non-uniform network conditions.

Figure 3:
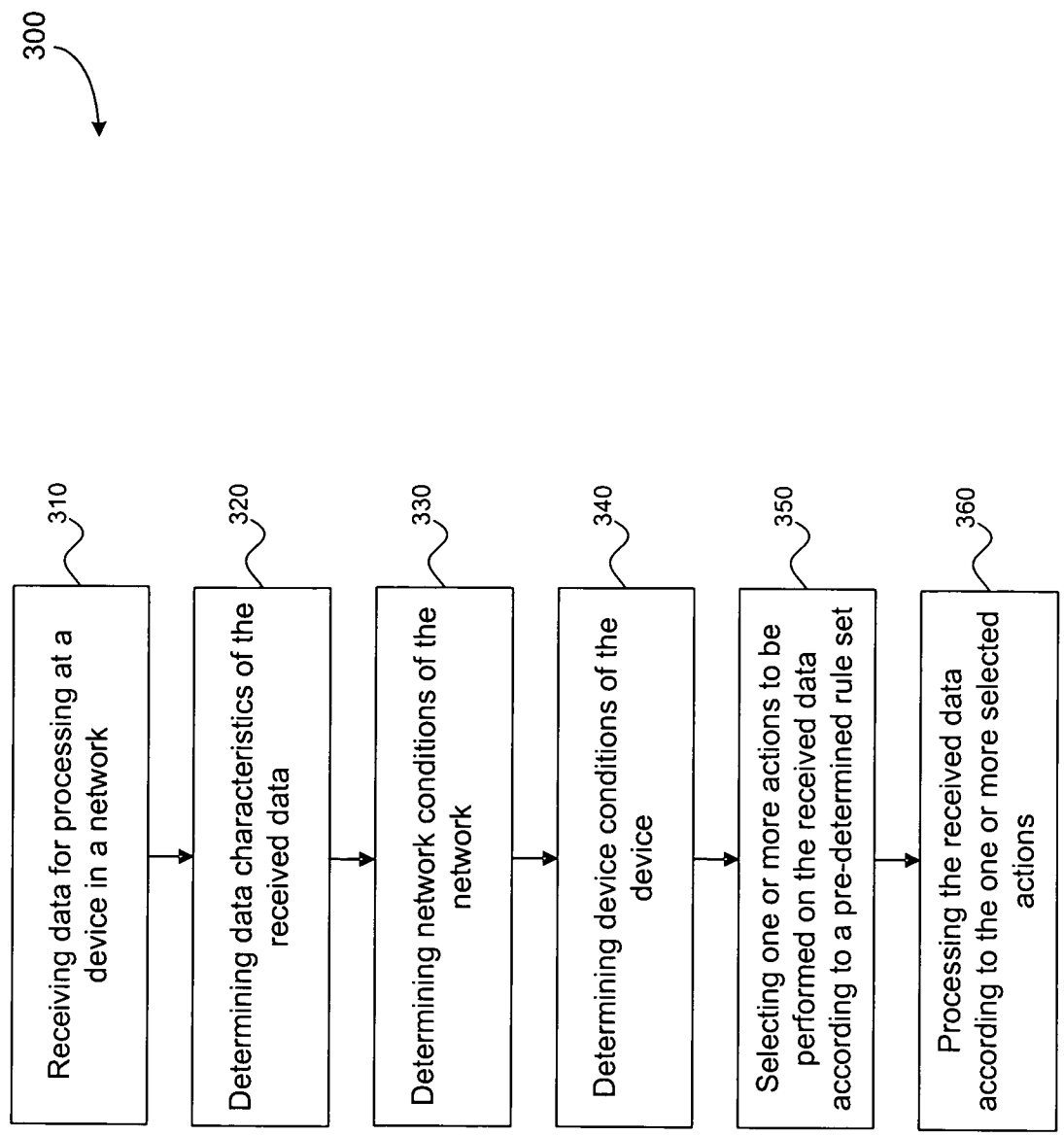
FIG. 3 is a process flowchart for a method for rule-based data processing in a wireless sensor network.

FIG. 3 is a process flowchart 300 for a method for rule-based data processing and/or dissemination in a wireless network. In an embodiment, the wireless network is an ad hoc network such as a wireless sensor network, for example. Process flowchart 300 begins in step 310, which includes receiving data for processing at a device in a network. In an embodiment, the device may be a wireless node having wireless communication capabilities. In another embodiment, the device may have data sensing capabilities. For example, the device may include a radar sensor, a camera sensor, or a trip wire sensor. In another embodiment, the device may have data processing capabilities. For example, the device may have data compression or data display (radar data display or image display) capabilities. Further, the device may have the ability to transmit a plurality of data types such as audio and video, for example. In an embodiment, step 310 is achieved by the device receiving data from a neighboring wireless node. In another embodiment, step 310 is achieved by receiving data generated at the device itself using a sensor of the device, for example.

Referring to FIG. 3, step 320 includes determining data characteristics of the received data. In an embodiment, the data characteristics include several parameters including the data type, the data size, the data origin, the data destination, and the data urgency of the received data as determined by the sensor. According to embodiments of the present invention, the data characteristics may be a determining factor in the type of data processing and/or dissemination methods applied on the received data.

The data type denotes the content of the received data. For example, the data type may denote whether the received data represents control or data information. Further, the data type may denote whether the received data is of audio, video, image, or sensor data type, for example. According to the determined data type, different processing and/or dissemination methods may be used. For example, in a target tracking application, sensor data received from multiple sensors in response to a common event in the network may be fused at an intermediate sensor node before forwarding the data to the sink node. This type of fusion may not be applicable in the case of audio data type, for example. On the other hand, data of audio type may have higher QOS requirements than image data in certain applications, for example, and thus each data type may be disseminated using a different data dissemination approach.

The data size denotes the size in bytes of the received data, and also determines the type of data processing and/or dissemination used on the received data. For example, a data flooding transport approach may be a feasible dissemination solution for a small size data packet, but would severely congest the network if used for a large size data packet.

The data origin of the received data denotes the node in the network where the received data was first generated. In an embodiment, the data origin of the received data denotes the sensor node which generated the data. For example, in a certain application, the device may employ a dissemination approach whereby received data originating at a group of nodes in the network is disseminated using more reliable methods than data originating at other nodes in the network. This group of nodes may represent, for example, a group of sensors having generated highly reliable data in a past period of time.

The data destination of the received data denotes the intended final destination of the received data. In a wireless sensor network, the intended final destination is typically the sink node in the network. In other types of networks, however, which support audio and video communication between intermediate nodes in addition to sensor data traffic, the intended final destination may be any intermediate node or even another source node in the network. For example, the latter case would apply to scenarios in which it is desired to have detection at one source node trigger a collection at another. In an embodiment, the data destination of the received data determines the data dissemination approach to route the received data. For example, if the data destination is one hop away from the device, a direct unicast approach may be sufficient to forward the data. On the other hand, a geographic routing approach may be used if the data destination falls far from the device.

The data urgency of the received data denotes the level of urgency of the received data, and may also affect the type of data processing and/or dissemination employed for the received data. For example, in certain applications, certain data types, such as voice and audio, may be deemed more urgent than other data types supported by the network. Other factors as described above may also play a role in determining the urgency of the received data. In turn, the urgency of the received data may determine the reliability of the data dissemination approach used to forward the received data as well as the priority of execution of actions required for carrying out the data dissemination.

Referring back to FIG. 3, step 330 includes determining network conditions of the network. In an embodiment, network conditions comprise several parameters including network traffic conditions, network load conditions, and network connectivity conditions. Network conditions are not limited to the parameters mentioned herein and embodiments of the present invention can be readily extended to account for other network related conditions.

According to embodiments of the present invention, network conditions can be used to determine the best suited data processing and/or dissemination approach for received data. Further, since network conditions may be non-uniform at different regions or even at adjacent nodes in the network, data processing and/or dissemination methods may differ based on network conditions from one node to another.

Network conditions may be actual or estimated conditions. Further, network conditions may be instantaneously calculated, measured over long periods of time, or statistically generated.

Network traffic conditions denote conditions related to the data traffic in the network. This may include conditions related to the type or the makeup of the data traffic and/or the expected arrival process of the data traffic. For example, network traffic conditions may be used to describe the burstiness of the data traffic. According to embodiments of the present invention, network traffic conditions may be used to determine the optimum data processing and/or dissemination methods for received data at a sensor node. For example, in a voice wireless network that additionally supports sensor data traffic, sensor data traffic may be disseminated in between bursts of audio traffic that occur in the network.

Network load conditions denote conditions related to the congestion of nodes and links of the network. Network load conditions may be determined, for example, by measuring link delays between nodes in the network. According to embodiments of the present invention, network load conditions may be used to determine the best suited data processing and/or dissemination methods for received data at a sensor node. For example, a sensor node may revert to delayed and/or compressed data dissemination methods when high load conditions are detected in the network.

Network connectivity conditions relate to the level of connectivity between nodes in the network. Connectivity in the network may be quantified using different network robustness parameters, such as, for example, the number of paths between any two nodes in the network, the average number of hops between any two nodes in the network, or as the probability of a node in the network being connected to the sink node. According to embodiments of the present invention, connectivity conditions may determine the type of data processing and/or dissemination methods that are used by a sensor node in the network. For example, given low network connectivity conditions, a sensor node may determine that flooding of data is the optimal approach to ensure that data is received at the sink node in the network. Further, the sensor node may determine not to fuse data to increase data redundancy in the network under low connectivity conditions.

Referring back to FIG. 3, step 340 includes determining device conditions of the device. In an embodiment, the device conditions include, among other parameters, the device power condition, the device transmit/receive capabilities, the device geographical location, and the device supported network protocols. According to embodiments of the present invention, the device conditions can be used to determine the best data processing and/or dissemination methods for received data. This will be further described below.

The device power condition indicates the remaining battery life of the device. Accordingly, the device power condition may govern the type of data processing and/or dissemination methods that may be used by the device. For example, in a wireless sensor network application, low remaining battery life of a sensor node may preclude resource intensive data processing such as compression or data fusion, for example. Indeed, under extreme energy shortfalls, the node may merely send an alert notification informing other nodes that the data has been sensed and then store the data locally for later retrieval on demand. Data dissemination is also affected by the device power condition, whereby exhaustive dissemination approaches may be avoided under low device power conditions.

The device transmit/receive capabilities include parameters such as the device transmission range, the device supported transmit/receive data rates, and the actual data throughput available to the device given the current radio channel environment. According to embodiments of the present invention, data processing and/or dissemination methods at the device are affected by the transmit/receive capabilities of the device. In an embodiment, the device transmission range may determine the nature of routes used by the device to forward data through the network, and consequently govern the type of data dissemination methods used by the device. For example, the device transmission range may determine whether a node has a direct link to the sink node, and as a result determines whether a multihop (store and forward) or a direct unicast dissemination approach is used by the node.

The device supported transmit/receive data rates relate to the data throughput available to the device under current network conditions. The data throughput governs the speed at which a given node may transmit and/or receive information. Accordingly, the device supported transmit/receive data rates may also be used to determine the type of dissemination that may be used by the device. Further, the transmit/receive data rates of neighboring nodes may also play a role in determining the type of dissemination at the device. For example, when neighboring nodes have high throughput links, flooding can be used more often because the network has enough bandwidth to support such dissemination scheme. With mobile nodes, especially, communication throughput will vary with inter-node separation and dynamic interference conditions.

The device geographical location may also be used to affect the type of data processing and/or dissemination methods used at the device. For example, in a wireless sensor network, a given node's geographical location in connecting two partitions of the network may determine that the node employ specific dissemination schemes so as not to become a bottleneck in the network.

The device supported network protocols denote the available transport and/or routing protocols available to the device. As is apparent to a person skilled in the relevant art(s), the device supported protocols may also be used to determine the type of data dissemination methods that a device may use. In an embodiment according to the present invention, a device may have available a plurality of transport and/or routing protocols.

Referring back to FIG. 3, step 350 includes selecting one or more actions to be performed on the received data according to a pre-determined rule set. The pre-determined rule set defines actions to be performed on the received data based on the data characteristics, the network conditions, and/or the device conditions as described above. In an embodiment, the rule set at one device in the network is independent of rule sets at other devices in the network and are configured independently of each other. In another embodiment, the rule set is configurable without the need for recompiling. For example, the rule set may be configured using a human readable language such as XML.

Figure 2:
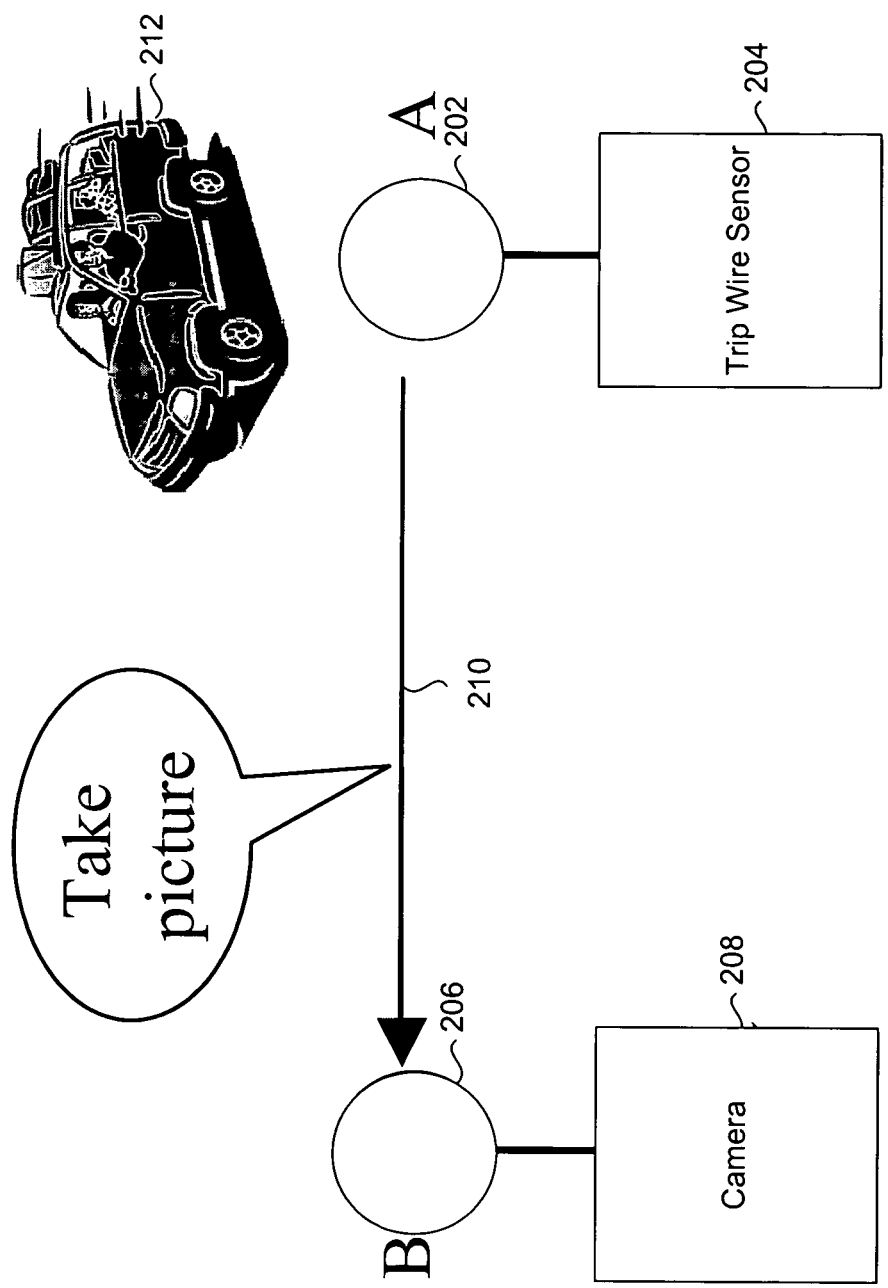
FIG. 2 is an illustration of a smart data dissemination example in a wireless sensor network.

In an embodiment, the one or more actions include data processing and/or dissemination of the received data as described above. In another embodiment, the actions comprise actions to trigger other actions at the device or at another device in the network. This is illustrated in the example of FIG. 2, where a first node A 202, equipped with a trip wire sensor 204, triggers a second node B 206, equipped with a camera 208, to take a picture of a target 212. In the example of FIG. 2, target 212 represents a stimulus for node A, which upon detection of target 212 processes the generated sensor data and transmits a data packet 210 to node B 206 to trigger the taking of the picture.

In another embodiment, the one or more actions defined by the rule set are prioritized according to action importance and/or action resource requirement. For example, audio data dissemination may be afforded higher importance than sensor data dissemination in a network. Further, flooding actions, which are resource intensive, may be assigned lower priorities in order to preserve the resources of the network.

Referring back to FIG. 3, step 360 includes processing the received data according to the one or more selected actions. In an embodiment, step 360 is achieved by carrying out the actions selected in step 350. For example, step 360 is achieved by the actual transmission of received data when a data dissemination action is selected.

In the following, systems implementing the above described method for data processing and/or dissemination will be described.

Figure 4:
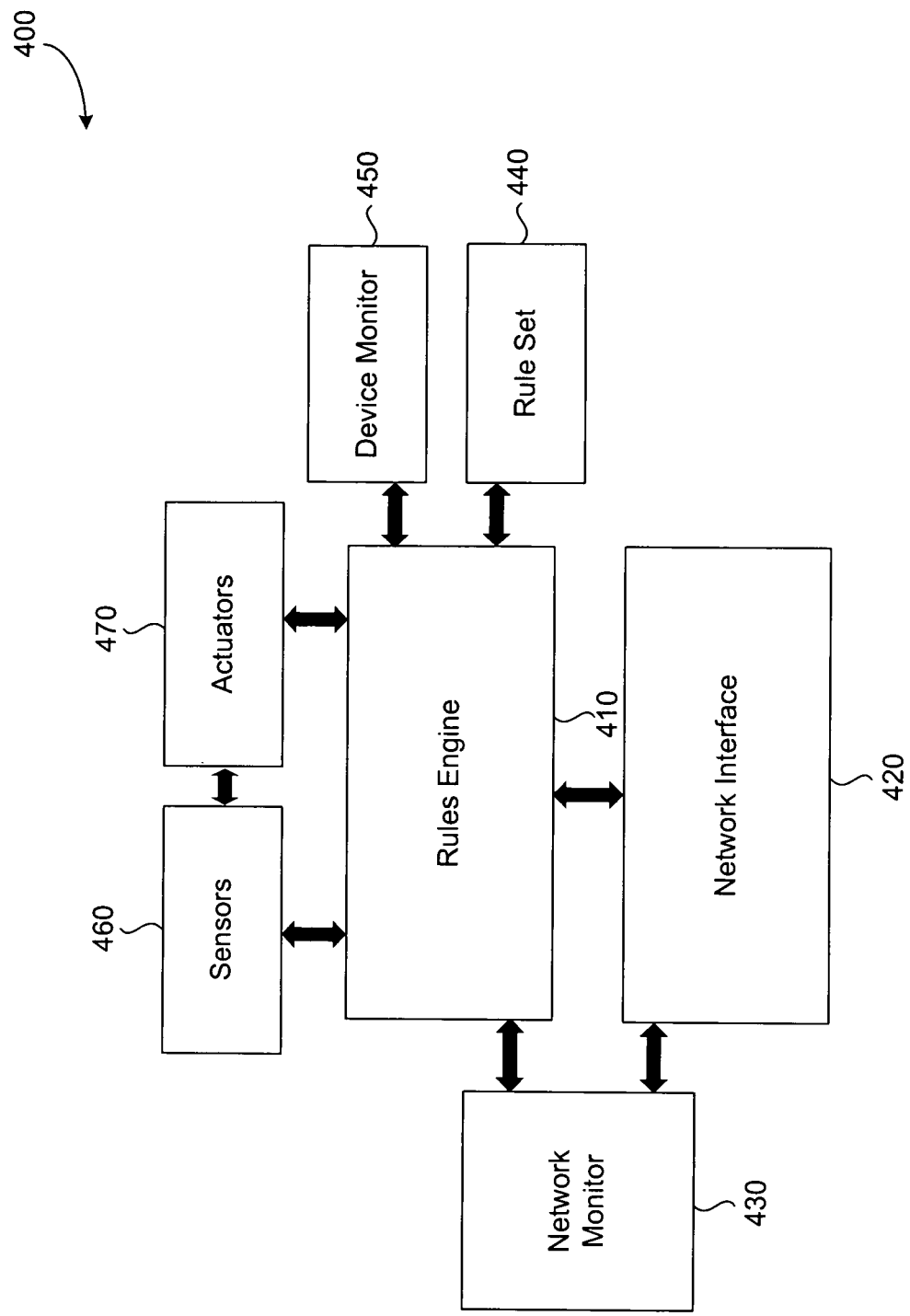
FIG. 4 is a block diagram of a system implementing the process flowchart of FIG. 3.

FIG. 4 is a block diagram of a system 400 implementing the process flowchart of FIG. 3. System 400 may be a wireless or a wired device for processing and communicating data in a network. System 400 may include, as shown in FIG. 4, a rules engine 410, a network interface 420, a network monitor 430, a rule set block 440, a device monitor 450, one or more sensors 460, and one or more actuators 470. In other embodiments, system 400 may include more or less components of what is shown in FIG. 4.

Rules engine 410 represents the processor of system 400 for processing the data and for specifying one or more actions to be performed on the data according to a pre-determined rule set. In an embodiment, the data is generated by the one or more sensors 460 of system 400 (and input into rules engine 410) or is received from another device in the network through network interface 420 (and input into rules engine 410). In an embodiment, sensors 460 include a radar sensor, a camera sensor, and/or a trip wire sensor. Other types of sensors may be used depending on the specific networking application.

The pre-determined rule set is defined by rule set block 440, which may include a configurable file for storing the rule set. The pre-determined rule set is independent from one device in the network to another, and is also extensible and/or modifiable. In an embodiment, rule set block 440 includes a rule set file for defining actions based on different network conditions, device conditions, and data characteristics as described above. In an embodiment, the rule set file includes an XML file. In the system of FIG. 4, the network conditions are determined by network monitor 430 through network interface 420, and are input into rules engine 410. The device conditions are determined by device monitor 450 and input into rules engine 410.

Actions defined in the rule set file include data dissemination actions for communicating the data to other devices in the network as described above. In the system of FIG. 4, data dissemination actions are performed using network interface 420, which connects system 400 to the network. Network interface 420 is capable of implementing a plurality of network transport and/or routing protocols. Further, actions defined in the rule set may include data processing actions (data compression and/or fusion) and/or actions that trigger other actions within system 400 or at other devices in the network. Such actions are performed using the one or more actuators 470 of system 400. For example, actuators 470 may include a camera, a radar data display, an image display, and/or a trip display. Other types of actuators may also be used depending on the specific networking application.

Figure 5:
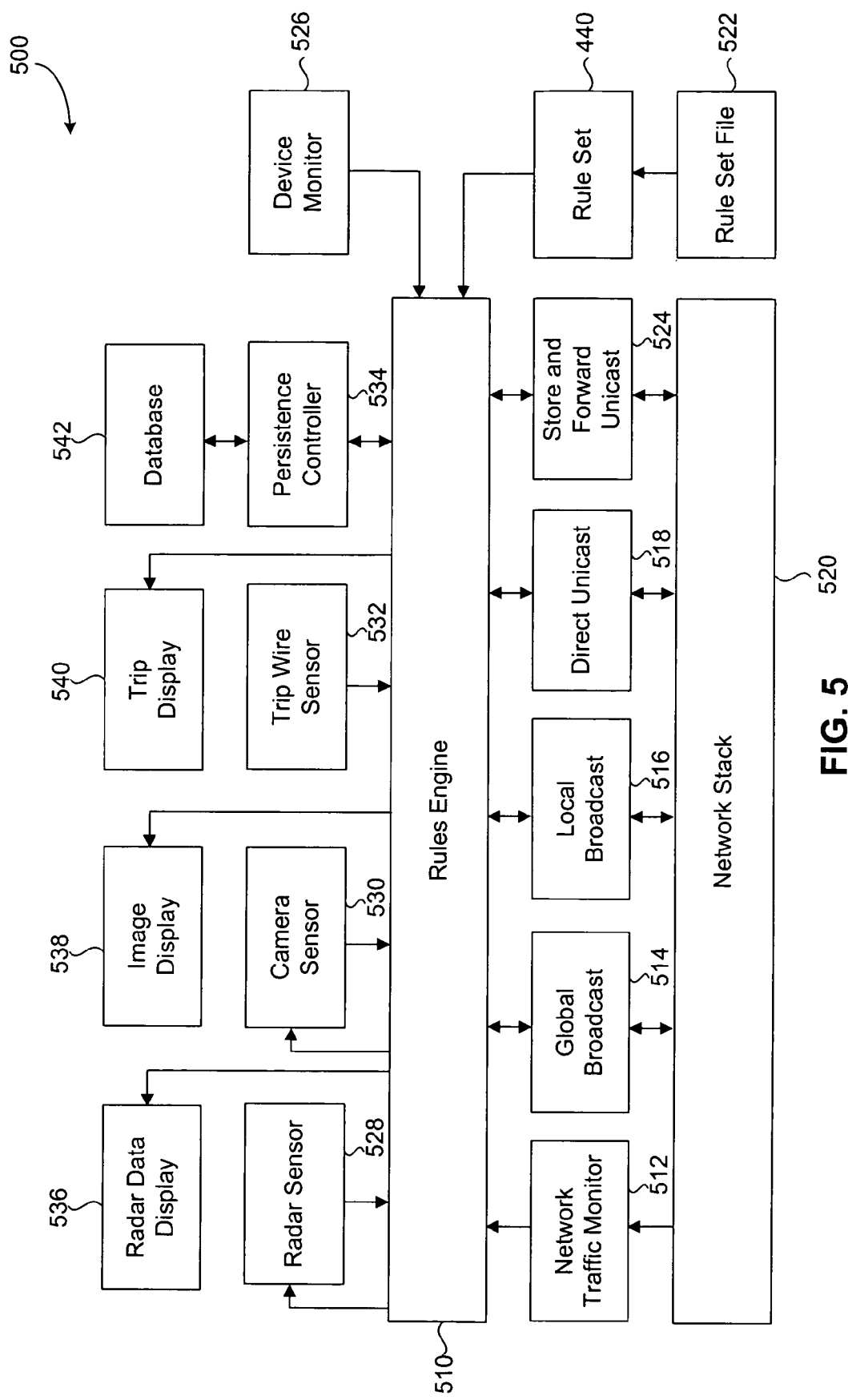
FIG. 5 is a block diagram of another system implementing the process flowchart of FIG. 3.

FIG. 5 is a block diagram of another system 500 implementing the process flowchart of FIG. 3. System 500 may be a wireless or a wired device for processing and communicating data in a network. System 500 includes, as shown in FIG. 5, a rules engine 510, a network stack 520, a network traffic monitor 512, a rule set block 440 (and an associated rule set file 522), a device monitor 526, one or more sensors 528, 530, 532 and associated actuators 536, 538, and 540. System 500 further includes a database 542, a persistence controller 534, and a plurality of dissemination modules 514, 516, 518, and 524. In other embodiments, system 500 may include more or less components of what is shown in FIG. 5. Interfaces and/or data buses connecting different elements of system 500 are as shown in FIG. 5. Bidirectional interfaces and/or data buses are illustrated as double-sided arrows.

Rules engine 510 represents the processor of system 500 for processing the data and for specifying one or more actions to be performed on the data according to a pre-determined rule set. In an embodiment, the data is generated by the one or more sensors 528, 530, or 532 of system 500 (and input into rules engine 510) or is received from another device in the network through network stack 520 (and input into rules engine 510). In an embodiment of FIG. 5, sensors 528, 530, and 532 include a radar sensor, a camera sensor, and a trip wire sensor, respectively. Other types of sensors may also be used in system 500 depending on the specific networking application.

Rule set block 440 is similar to the one described above with reference to FIG. 4. Rule set 440 has an associated rule set file 522, which defines actions to be performed on the data based on different network conditions, device conditions, and data characteristics, as described above. In an embodiment of system 500, rule set file 522 includes an XML file.

In the system of FIG. 5, the network conditions are determined by network traffic monitor 512 through network stack 520, and are input into rules engine 510. The device conditions are determined by device monitor 526 and input into rules engine 510.

In system 500, actions defined in rule set file 522 include data dissemination actions for communicating the data to other devices in the network as described above. Data dissemination actions are performed using network stack 520, which connects system 500 to the network. Network stack 520 is capable of implementing a plurality of network transport and/or routing protocols. In an embodiment, network stack 520 implements a TCP/IP network stack.

In an embodiment, rules engine 510 specifies the type of dissemination using one of dissemination modules 514, 516, 518, or 524. Each of dissemination modules 514, 516, 518, and 524 defines dissemination actions for its associated dissemination approach. For example, Global Broadcast module 514 defines that a data packet for dissemination is to be flooded over the entire network. Accordingly, Global Broadcast module 514 specifies no destination address for the data packet. Similarly, Local Broadcast module 516 specifies the number of hops that a data packet is to be flooded over the network. Direct Unicast 518 and Store and Forward Unicast 524 modules also define dissemination parameters specific to their dissemination methods.

Further, actions defined in the rule set may include data processing actions (data compression and/or fusion) and/or actions that trigger other actions within system 500 or at other devices in the network. Such actions are performed using actuators 536, 538, and 540 of system 500. For example, the processing of received data at rules engine 510 may trigger that the received data be displayed using Image Display 538. Other types of actuators may also be used in system 500 depending on the specific networking application.

System 500 also includes a persistence controller 534 and a database 542. Together, these capabilities provide another destination for virtual dissemination of data. For example, long-term persistence at a record-keeping node provides an archive to support on-demand data retrieval and forensic analysis of activities. Additionally, short-term persistence at a sensor node provides a means of delaying data transmission until a later time. For example, data transmission may be delayed until network traffic subsides; conversely, data transmission may be delayed pending a correlating event from another sensor, and dropped altogether after a time-out if the correlating event is not received.

Example rule sets that can be used in devices according to the present invention will now be provided. The rule sets described below are exemplary and should not be used to limit the invention. Other types of rule sets defined using other programming languages or having different formats may also be used.

FIG. 6 is an example rule set 600 configured using XML that may be used in a wireless sink node (command node) receiving data from source nodes in a sensor field. Rules, as shown in FIG. 6, are defined in terms of conditions and corresponding actions. For example, a first rule in the example of FIG. 6 is a beeping action whenever an alert is received at the node.

FIG. 7 is another example rule set 700 configured using XML that may be used in a wireless sensor node equipped with a radar sensor and a camera sensor. Rules are defined in terms of conditions and corresponding actions. For example, a first rule in the example of FIG. 7 indicates that a radar picture is to be taken whenever a radar report is received from local node (10.10.10.108). A second rule in the example of FIG. 7 indicates that upon receiving a radar report from local node (10.10.10.108), an event notification is to be sent to all other nodes.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for data processing at a wireless sensor device in a network, the method comprising:
   receiving, at the wireless sensor device, data for processing;
   determining, at the wireless sensor device, data characteristics of the data received at the wireless sensor device, wherein the data characteristics comprise data size;
   determining, at the wireless sensor device, a set of network conditions, wherein the set of network conditions comprises:
   network traffic makeup,
   network load conditions,
   network connectivity conditions, an expected process by which data traffic arrives at the wireless sensor device, the number of paths between the data origin and the data destination, the average number of hops between the data origin and the data destination, the probability of the wireless sensor device being connected to a sink node in the network, and the probability of the data destination being connected to the sink node;

determining, at the wireless sensor device, device conditions of the wireless sensor device;

determining, at the wireless sensor device, based on the device conditions, supported actions that the wireless sensor device is able to perform on the received data;

selecting, at the wireless sensor device, one or more of the supported actions to be performed on the received data according to a pre-determined rule set; and processing, at the wireless sensor device, the received data according to the one or more selected actions, wherein the pre-determined rule set defines actions to be performed on the received data based on the data characteristics and the set of network conditions, and wherein the actions defined by the rule set comprise data transformation actions.

2. The method of claim 1, wherein the device comprises one or more of a radar sensor, a camera sensor, a trip wire sensor, a radar data display, or an image display.

3. The method of claim 1, wherein the received data originates at the wireless sensor device or is received from another device in the network.

4. The method of claim 1, wherein the set of data characteristics further comprises:

data type, data origin, data destination, and data urgency.

5. The method of claim 1, wherein the device conditions comprise device power condition, device transmit and receive capabilities, device geographical location, and device supported network protocols.

6. The method of claim 1, wherein the actions defined by the rule set are prioritized according to action importance and action resource requirement.

7. The method of claim 1, wherein the actions defined by the rule set comprise data dissemination actions.

8. The method of claim 7, wherein the data dissemination actions implement a plurality of network transport and routing protocols.

9. The method of claim 1, wherein the data transformation actions include data compression and data fusion.

10. The method of claim 1, wherein the actions defined by the rule set comprise actions to trigger other actions at the wireless sensor device or at another device in the network.

11. A wireless sensor device for processing and communicating data in a network, comprising:

one or more sensors for sensing events in the network;

a network monitor for monitoring a set of network conditions, wherein the set of network conditions comprises:

network traffic makeup, network load conditions, network connectivity conditions, an expected process by which data traffic arrives at the wireless sensor device, the number of paths between the data origin and the data destination, the average number of hops between the data origin and the data destination, the probability of the wireless sensor device being connected to a sink node in the network, and the probability of the data destination being connected to the sink node;

a device monitor for monitoring device conditions;

a capabilities module for determining, based on the device conditions, supported actions that the wireless sensor device is able to perform on the data;

a rules engine for processing the data and for specifying the supported actions to be performed on the data according to a pre-determined rule set;

one or more actuators for performing the supported actions specified by the rules engine; and a network interface for communicating with other devices in the network, wherein the pre-determined rule set defines the actions to be performed on the data based on the set of network conditions and data characteristics of data received at the wireless sensor device, wherein the data characteristics comprise data size, and wherein the actions defined by the rule set comprise data transformation actions.

12. The wireless device of claim 11, wherein the one or more sensors comprise one or more of a radar sensor, a camera sensor, or a trip wire sensor.

13. The wireless device of claim 11, wherein the one or more actuators comprise at least one of a radar data display, an image display, or a trip display.

14. The wireless device of claim 11, wherein the data is generated by the one or more sensors of the device or is received from another device in the network.

15. The wireless device of claim 11, wherein the data characteristics further comprise data type, data origin, data destination, and data urgency.

16. The wireless device of claim 11, wherein the device conditions comprise device power conditions, device transmit and receive capabilities, device geographical location, and device supported network protocols.

17. The wireless device of claim 11, wherein the one or more actions to be performed on the data comprise data dissemination actions for communicating the data to other devices in the network using the network interface.

18. The wireless device of claim 11, wherein the data dissemination actions implement a plurality of network transport and routing protocols.

19. The wireless device of claim 11, wherein the data transformation actions, include one or more of data compression and data fusion.

20. The wireless device of claim 11, wherein the one or more actions comprise actions to trigger other actions at the device or at another device in the network.

21. The wireless device of claim 11, wherein the rule set is independent of rule sets used at other devices in the network.

22. The wireless device of claim 11, wherein the rule set is extensible and modifiable.

23. The method of claim 1, wherein the pre-determined rule set is configured according to a selected sensor networking application.

24. The method of claim 1, wherein the network load conditions comprise conditions related to congestion of nodes and links of the network.

25. The method of claim 5, wherein the device power conditions comprise remaining battery life of the device and power available to the device.

26. The method of claim 5, wherein the device transmit and receive capabilities comprise the device transmission range, the device supported transmit and receive data rates, and the actual throughput available to the device given a current radio channel environment.

27. The wireless device of claim 11, wherein the predetermined rule set is configured according to a selected sensor networking application.

28. The wireless device of claim 11, wherein the network load conditions comprise conditions related to congestion of nodes and links of the network.

29. The wireless device of claim 16, wherein the device power conditions comprise remaining battery life of the device and power available to the device.

30. The wireless device of claim 16, wherein the device transmit and receive capabilities comprise the device transmission range, the device supported transmit and receive data rates, and the actual throughput available to the device given a current radio channel environment.

31. The method of claim 25, wherein in response to determining a low power condition, the supported actions exclude resource intensive data processing.

32. The method of claim 31, wherein resource intensive data processing includes one or more of data compression, data fusion, flooding actions, or resource intensive data dissemination.

33. The method of claim 1, wherein determining the network conditions comprises estimating one or more of the network conditions.

34. The wireless device of claim 11, wherein one or more of the set of network conditions is estimated.

* * * * *